INTENSITY

WAVE NUMBER

INTENSITY

WAVE NUMBER

United States Patent Office 3,426,208
Patented Feb. 4, 1969

3,426,208
METHOD AND APPARATUS FOR MEASURING LIGHT SIGNALS OF LOW INTENSITY BY UTILIZATION OF SHOT NOISE
James E. Griffiths, Murray Hill, Yoh-Han Pao, Chatham, N.J., and Robert N. Zitter, New York, N.Y., assignors to Bell Telephone Laboratories, Incorporated, New York, N.Y., a corporation of New York
Filed Dec. 22, 1965, Ser. No. 515,605
U.S. Cl. 250—200
Int. Cl. H01j 39/10; G01j 1/24
6 Claims

ABSTRACT OF THE DISCLOSURE

The specification describes a new method for detecting electron emission from light detectors. The D.C. output of a phototube characteristically reflects random fluctuations called shot noise. In the usual prior art measurements this shot noise is filtered out and the D.C. component is recorded. However, in certain situations where the light radiation is weak there is more power in the fluctuations than in the steady current component. This method suggests using the fluctuating or shot noise component as the signal and discarding the D.C. component. The recognition that the shot noise is in fact a useful part of the signal is significant. The "noise" arises from the random behavior of the electron emission and when integrated provides a true measure of the incident photon flux.

---

This invention relates to the detection and measurement of light and is particularly useful for measuring light signals of low intensity.

The presence of light radiation and variations in light intensity are normally recorded through photoelectric conversion and monitoring of the resulting electric signal. The photoelectric conversion is customarily achieved either with a photoemissive material such as cesium alloyed with antimony or bismuth which absorbs incident light radiation and emits electrons or a photoconductive material such as lead sulfide or cadmium selenide which changes resistivity when subject to light radiation. The electron current flow bears a precise relationship to the number of photons incident on the light-sensitive material. Photocells based upon these general principles have been used for many years in a variety of applications.

Recently, laser systems, including devices for producing, modulating, amplifying and detecting light signals, have become extremely important particularly for various forms of communication. Other specific areas of application which rely on photodetectors are in television cameras, light switches, memory arrays using stored light, and memory systems based on holograms. The role of the photodetector as a research tool is important also.

The operation of the conventional photoemissive detector is based on free electron emission from a photoemissive surface as a result of incident photons. The energy E of each photon is given by Planck's constant $h$ and the light frequency $\nu$ thus:

$$E = h\nu \quad (1)$$

If this energy equals or exceeds the work function of the photoemissive cathode then electron flow results due to the creation of free electrons. The above equation can be written in terms of electron volts and the wavelength of the light $\lambda$ measured in microns:

$$\text{electron volts} = 1.23/\lambda \quad (2)$$

The photoemissive cathode material can be chosen according to the wavelength of interest and typical commercial phototubes have specific regions of the spectrum in which they are sensitive. For the visible spectrum of 4000 A. to 7000 A. the photon energies lies in the range of 1.76 ev. to 3.08 ev. If the energy of the photon falls below the photoelectric cathode work function no emission occurs regardless of the intensity of the incident light. Otherwise the photocurrent is a direct function of the intensity. A photoconductive cell operates in a similar manner except that free electrons are not usually created. The electrons receiving the photon energy are normally valence electrons which are driven into the conduction band and the conductivity increase in the material is measured with a continuous test current. The quantum relationship is similar to that of the photoemissive detectors except that the energy required to create a hole-electron pair is less than that needed to create a free electron.

Since the energy exchange process and the electron conversion do not occur instantaneously, there is an unpredictable time lag between the absorption of photons and the creation of free or paired electrons, even though there is a definite quantum overall relationship. If the light radiation incident on the photosensitive surface has a constant flux, the electron output will fluctuate due to this random behavior in the photoelectric process. These fluctuations are commonly known as "shot noise" and ordinarily are filtered, as effectively as possible, from the signal. However, there is a fundamental property of shot noise which is not characteristic of other common forms of noise, and that is that shot noise is a direct consequence of the incident signal and bears a definite relationship to it. This means that the desired information about the incident light intensity can be recovered by detecting the shot noise power directly.

According to this invention the shot noise, rather than being discarded, is used to measure the light signal. It will be shown herein that in measuring light signals of low intensity the measurement of the shot noise provides a more reliable measurement than the measurement of the signal directly.

These and other aspects of the invention will perhaps be more fully appreciated when considered with the following detailed description. In the drawing.

Figure 1:
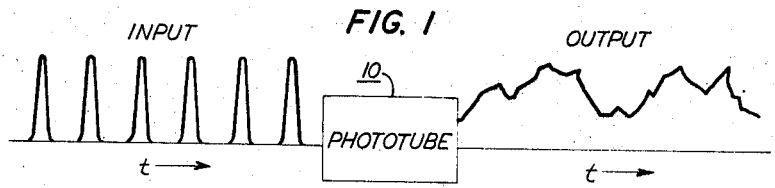
FIG. 1 is a schematic plot of an input light signal into a photodetector and the electrical output.

FIG. 1 illustrates the nature of shot noise. The input is a random series of impulses (with time represented on the horizontal axis) which may be considered as photons or photon pulses of light applied to the phototube 10. Note that the pulses are discrete. The output of the phototube which symbolizes the photoelectric current shows the random nature of the electron behavior. Ordinarily the average D.C. power is measured by eliminating the fluctuating or A.C. components.

Figure 2:
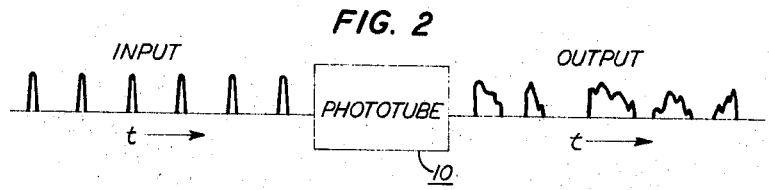
FIG. 2 is a schematic plot similar to that of FIG. 1 except that the intensity of the light input is reduced.

Now consider FIG. 2 in which the light intensity of the input signal is very low. The output from the phototube 10 is now composed principally of fluctuations and the D.C. component is comparatively small. Intuitively it can be appreciated that when there is more electrical power in the fluctuating component than in the D.C. component there is greater reliability in measuring the fluctuating component and discarding the D.C. component than in the converse measurement. This conclusion is based upon the recognition that the fluctuating component of the signal or shot noise, in spite of its name, is a genuine and useful part of the original signal.

The average power measurement which is referred to here as the D.C. measurement includes variations in the signal which have comparatively low frequencies. The fluctuating component or shot noise signal, as referred to herein is considered as an A.C. signal having characteristic frequencies above 1 kc. Thus it is convenient to define the invention in terms of detecting low intensity light signals (below $10^5$ incident photons per second) by the use of a photodetector which produces shot noise in the electrical output and measuring that portion of the power spectrum of the electrical output having A.C. frequencies above 1 kc.

Viewed in a more general way the D.C. component is the actual signal which ordinarily one would attempt to measure. According to this invention it is discarded and the desired information is obtained from the noise.

In the case of a light signal being measured which has a characteristic signal frequency, the photodetector output would be filtered to eliminate the signal frequency and the noise power would be measured. For instance, in a communications system the photodetector output would pass through two or more narrowband filters to eliminate the carrier and all sideband frequencies or through a bandpass filter which passed a large portion of the shot noise power spectrum. The shot noise would be measured by integrating the power spectrum at the frequencies passed and would provide a reliable indication of the instantaneous amplitude of the original light signal. Thus it will be appreciated that the method of this invention has a general application to the measurement of all forms of light signals of low intensity and basically relies on discarding the signal (D.C. or A.C.) from the photodetector and measuring the shot noise.

It happens that, statistically, the shot noise produced by the photodetector is proportional to the one-half power of the desired signal. Consequently in making the measurement according to the invention the A.C. power (above 2 kc.) is squared, thus giving a linear electrical response to the light radiation being measured.

To determine the areas in which the technique of this invention presents unexpected advantages over the conventional prior art technique, both cases will be considered in terms of known relationships which describe the signal-to-noise ratios. A comparison then defines the most useful applications of this invention.

Figure 3:
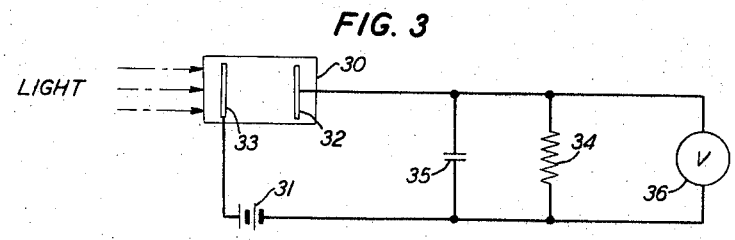
FIG. 3 is a conventional electrical circuit for a photodetector.

The basic circuit for a photodetector is shown in FIG. 3. The phototube 30 is of conventional design and contains a photoemissive cathode 33 with a field created by voltage source 31. The anode 32 collects the free electrons as they are emitted from the photoemissive material in accordance with the intensity of the incident light (indicated by arrows). The terminating impedance comprises an RC circuit including a resistor 34 and capacitor 35 with a voltmeter 36 across the load.

Assume that when an electron is emitted at time, $t=0$, the voltage across the output terminals is:

$$f(t) = \frac{e}{C} e^{-t/RC} \qquad (3)$$

where

C = capacitance associated with the circuit and the internal capacitance of the phototube
R = resistance
e = electron charge Let the average rate of emission of electrons be N. Then for a statistically steady state the average voltage at 36 may be written:

$$<V> = N \int_0^\infty f(t)dt = N\frac{e}{C}\int_0^\infty e^{-t/RC}dt = NeR \equiv IR \qquad (4)$$

A measure of the D.C. power is then given by $$<V>^2 = I^2R^2$$

and a similar measure of the power in the voltage fluctuations is:

$$<\delta V^2> = N\int_0^\infty f^2(t)dt = N\frac{e^2}{C^2}\int_0^\infty e^{-2t/RC} = \frac{Ne^2R}{2C} \equiv \frac{IeR}{2C} \qquad (6)$$

Assume that the noise power is distributed uniformly over all frequencies from 0 to B where B is the bandwidth. The RC impedance is determined by the relationship.

$$B = 1/RC$$

Consider the usual prior art photodetection scheme in which the electron emission is measured in terms of the average D.C. power. A low-pass filter is used at the phototube output and the filtered signal is amplified and recorded. The low-pass filter eliminates most of the A.C. component but the A.C. power corresponding with the bandwidth of the filter accompanies the D.C. signal as noise. One specie of this method is known generally by the term "lock-in amplification" in the sense that the amplified signal being detected is locked in on a narrow frequency band. To provide an indication of its effectiveness the signal to noise ratio will be examined. Let $f$ = bandwidth of the low-pass filter. Then:

$$\frac{\text{Signal power}}{\text{Noise power}} = \frac{<V^2>}{<(\delta V^2)> \times \frac{f}{B}} = \frac{I^2R^2}{\frac{IeR}{2C} \times \frac{f}{B}}$$

but $I = Ne$ and $B = 1/RC$ so that for the lock-in amplifier method:

$$\frac{\text{Signal power}}{\text{Noise power}} = \frac{2N}{f}$$

In the method of this embodiment of the invention the A.C. power spectrum above 2 kc. arising from the shot noise is squared to give a measurable average D.C. counterpart of the shot noise component of the signal. This power, as given by Equation 6, is always greater than the average D.C. power expressed in Equation 5 whenever $IeR/2C > I^2R^2$. Substituting $1/RB$ for C (Equation 7) and $Ne$ for I, this expression reduces to $B > 2N$.

After squaring, the signal is sent through a narrowband pass filter with bandwith $f'$ which largely eliminates the A.C. components. For the same integration time $t = f'$, the theoretical value for the ratio of signal power to noise power for the shot noise squaring method is always at least twice that of the lock-in amplifier method. If photomultiplication is used the theoretical ratio becomes considerably more favorable for the noise squaring method. For reasons which are not fully understood the advantages of the noise squaring method which have actually been observed are considerably greater, the effectiveness being an order of magnitude and sometimes two orders above the prior art methods.

Consequently the noise squaring method of this invention proves superior to the conventional prior art technique for measuring low intensity light signals and particularly where the bandwidth of the radiation being detected in cycles is greater than twice the number of incident photons per second.

The bandwidth B is fixed by the characteristic frequency distribution of the signal power, so that the result means simply that this method is most useful where the signal has a large bandwidth relative to the light intensity.

Figure 4:
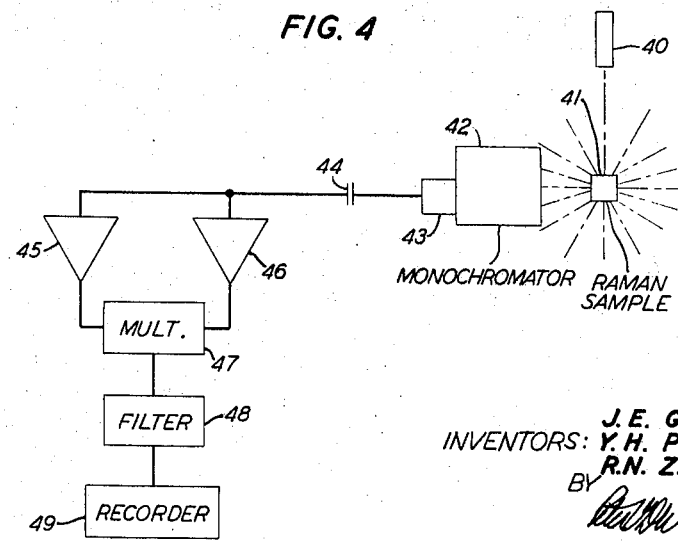
FIG. 4 is a schematic circuit diagram for measuring low-intensity light according to this invention.

The invention was demonstrated using the apparatus shown schematically in FIG. 4. The purpose of the experiment was to determine the isotope fine structure of the $CCl_4$ 459 cm.$^{-1}$ Raman band. The power was 15 mw.; slit width 1.2 cm.$^{-1}$; scan rate 1.75 cm.$^{-1}$/min. and time constant 2 sec. The light source 40 is a helium-neon laser with its output incident on the sample 41. Scattered light from the sample travels through a monochromator 42.

The output of the monochromator is sensed by a phototube 43. The sensing scheme of this invention was used to detect the electron emission from the phototube since the rate of electron emission, N, is characteristically small in Raman spectroscopy. The electrical signal is passed through D.C. filter 44, amplified by passing it through two parallel amplifiers 45 and 46, and then squared by multiplying the amplifier outputs at multiplier 47. This arrangement, while not essential, has the added advantage of reducing amplifier noise. The squared signal, which now comprises both A.C. and D.C. components, is filtered through a narrowband pass filter 48 to eliminate most of the A.C. components. The D.C. value of the signal, which actually is a linear measurement of the power of the A.C. components of the original signal converted to a convenient form for measurement, is recorded with a D.C. recorder 49.

Figure 5A:
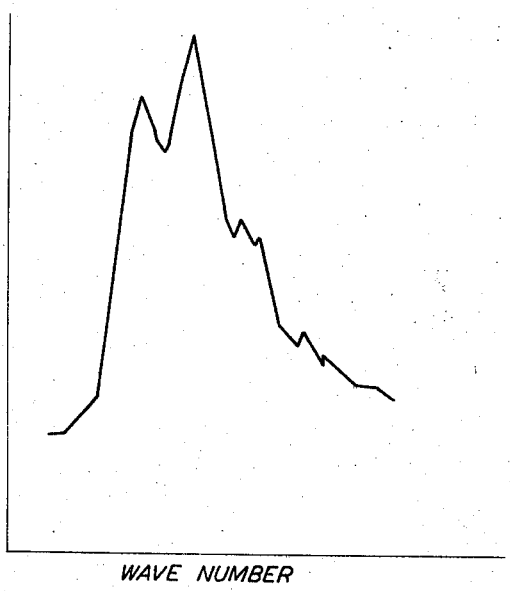
FIG. 5A is a Raman spectrum obtained using the conventional prior art technique.
Figure 5B:
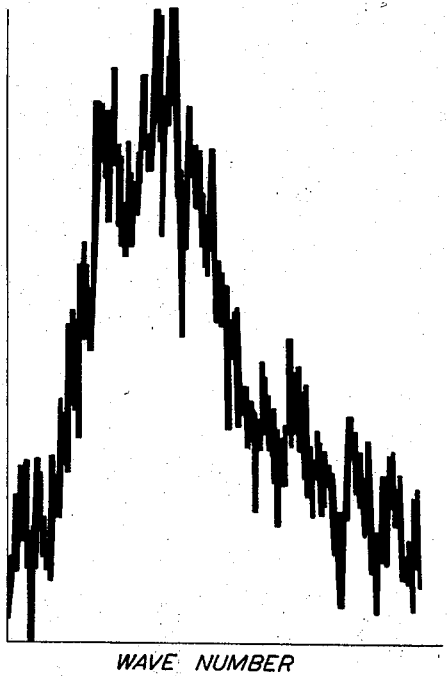
FIG. 5B is a Raman spectrum obtained using the method and apparatus of this invention.

The results of this detection method are shown in FIG. 5A and are compared with the signal resulting from the same Raman sample using the lock-in amplifier method which is shown in FIG. 5B. The plot in each case is intensity versus wave number. The separation between the two major peaks is 3.3 cm.$^{-1}$. It will be appreciated that the plot of FIG. 5B is more accurate and reliable than the data obtained in FIG. 5A using the prior art method.

In the foregoing example two parallel amplifiers were used and their outputs correlated. The principal reason for this arrangement is to reduce amplifier noise. However, in many cases this is an unnecessary precaution and the phototube output can be filtered, amplified in a single amplifier, squared using, for instance, a PSQ-N quadratic transconductor manufactured by Philbrick's Researchers, Inc., Boston, Mass., then filtered and recorded as in the above example.

While this example is directed to a photoemissive tube, a detector based on photoconduction exhibits identical behavior in terms of the property of interest and is within the scope of the invention. The analytical treatment given previously is qualitatively similar. The term "photodetector" as used herein is intended to be generic to devices operating on either principle.

The invention is equally applicable to any device in which "shot noise" is encountered to an appreciable extent.

Various additional modifications and extensions of this invention will become apparent to those skilled in the art. All such variations and deviations which basically rely on the teachings through which this invention has advanced the art are properly considered within the spirit and scope of this invention.

What is claimed is:

1. A method for measuring light radiation with a photodetector in which an electric current flow having both D.C. and A.C. components is initiated by absorption of photons which method comprises exposing the photodetector to light radiation, substantially eliminating the D.C. component of the electrical output of the phototube, amplifying the A.C. components of the photodetector output, squaring the resulting amplified signal, filtering out the A.C. component of the squared signal and measuring the D.C. component of the squared signal.

2. The method of claim 1 in which the light radiation is produced from a sample for Raman spectroscopy.

3. A method for measuring light radiation with a photodetector in which an electric current flow is initiated by absorption of photons which method comprises exposing the photodetector to light radiation, said light tradiation carrying a signal at a prescribed frequency, passing the electrical output through a narrowband filter to eliminate the signal frequency, amplifying the noise power spectrum passing the narrowband filter, squaring the amplified noise and detecting the noise power level.

4. An apparatus for measuring low intensity light radiation which comprises in combination a photodetector in which an electric current having both D.C. and A.C. components is generated in response to light radiation, means for filtering out the D.C. current of the photodetector output, means for amplifying the filtered output and means for squaring the amplifier output thus producing both D.C. and A.C. components and electrical means for measuring the D.C. component of the squared signal.

5. The apparatus of claim 4 in which the photodetector is a photoemissive detector.

6. The apparatus of claim 4 in which the photodetector is a photoconductive detector.

References Cited

UNITED STATES PATENTS

| | | | |
|---|---|---|---|
| 3,204,105 | 9/1965 | Robinson | 84—14 |
| 3,222,980 | 12/1965 | Kalmus | 88—23 |

JAMES W. LAWRENCE, *Primary Examiner.*

E. R. LA ROCHE, *Assistant Examiner.*

U.S. Cl. X.R.

88—23; 315—158; 324—20